United States Patent
Hsu

(10) Patent No.: US 6,566,784 B1
(45) Date of Patent: May 20, 2003

(54) STATOR STRUCTURE WITH SINGLE-ARM TOOTH HOLDERS

(76) Inventor: Chun-Pu Hsu, No. 19, Wu Chuang Liu Rd., Wu Ku Industrial Park, Taipei Hsien (TW)

(*) Notice: Subject to any disclaimer, the term of this patent is extended or adjusted under 35 U.S.C. 154(b) by 0 days.

(21) Appl. No.: 10/145,790

(22) Filed: May 16, 2002

(51) Int. Cl.7 .......................... H02K 15/00; H02K 1/14; H02K 1/00; H02K 1/12
(52) U.S. Cl. ...................... 310/254; 310/216; 310/218; 310/192; 310/259; 310/217; 310/263; 310/180
(58) Field of Search ............................... 310/216–218, 310/254, 1, 8

(56) References Cited

U.S. PATENT DOCUMENTS

| | | | | |
|---|---|---|---|---|
| 4,990,809 A | * | 2/1991 | Artus | 310/190 |
| 6,313,557 B1 | * | 5/2001 | Itoh | 310/254 |
| 6,225,725 B1 | * | 11/2001 | De Filippis | 310/216 |
| 6,433,456 B1 | * | 8/2002 | Hingashino | 310/263 |

* cited by examiner

Primary Examiner—Nestor Ramirez
Assistant Examiner—Iraj A Mohandesi
(74) Attorney, Agent, or Firm—Rosenberg, Klein & Lee

(57) ABSTRACT

The present invention provides a stator structure, which keeps a lower cogging torque in the rotation direction of a motor at the same time of raising the magnetic reluctance between adjacent tooth holders of the stator. A tooth-holding end of each of each of the tooth holders in the rotation direction of heavy load is reserved, while the other tooth-holding end in the reverse direction is cut, hence forming a single-arm tooth holder with two asymmetric sides. Because a higher magnetic reluctance is generated between adjacent single-arm tooth holders, the self coupling phenomenon of magnetic lines of force between adjacent tooth holders of the stator can be reduced when the magneto motor operates under a high load. Armature reaction of the magneto motor operating under a high load can thus be intensified to enhance the operational efficiency, stability, and smoothness thereof.

1 Claim, 4 Drawing Sheets

STATOR STRUCTURE WITH SINGLE-ARM TOOTH HOLDERS

FIELD OF THE INVENTION

The present invention relates to a magneto motor having a stator with single-arm tooth holders, whereby the self-coupling phenomenon of magnetic lines of force caused by high electric loads can be eliminated.

BACKGROUND OF THE INVENTION

When a motor operates under a high load, it is necessary to increase the exciting current of exciting coils of a stator thereof so as to generate a relatively raised output torsion, as illustrated by the following equations:

$$E = K_E \cdot \Omega$$

$$K_E = B \cdot D \cdot L \cdot Z/2$$

$$T = K_T \cdot I_a$$

$$K_T = B \cdot D \cdot L \cdot Z/2$$

wherein E is the counter electromotive force voltage (volt), T is the output torsion (N–m), $K_E$ is the counter electromotive force coefficient, $K_T$ is the torsion coefficient, $\Omega$ is the rotation speed of the armature (rad/sec), $I_a$ is the armature current (ampere), B is the magnetic flux density of the air gap (gauss), D is the outer diameter of the armature (cm), L is the superimposition thickness (cm), and Z is the total number of turns of conductors.

As can be seen from the above formulas, the counter electromotive force coefficient $K_E$ equals the torsion coefficient $K_T$. Therefore, in order to have a larger output torsion T, it is necessary to raise the armature current $I_a$. The raised armature current (i.e., the exciting current) will inevitably generate an electromagnetic field, whose magnetic lines of force flow from tooth-holding ends of stator tooth portions through permanent magnets of a rotor to form a magnetic flux loop of armature reaction and also an output torsion. The strength of the magnetic lines of force of the magnetic flux loop of armature reaction depends on the magnitude of the output torsion of motor.

For a conventional motor, tooth-holding ends of a stator thereof are symmetrically arranged left and right. If the cogging torque of the motor is to be reduced, the spacing 217 between adjacent tooth holders is preferred to be smaller, as shown in FIG. 1A. There will be a magnetic reluctance relation generated between adjacent tooth-holding ends. The magnitude of this magnetic reluctance depends on the magnitude of the spacing between two adjacent tooth-holding ends. The smaller the spacing 217, the lower the magnetic reluctance, and the lower the cogging torque of motor and the smoother the operation. However, if the exciting current is raised, the magnetic lines of force of the electromagnetic field generated by the exciting coils will be larger. If the magnetic reluctance between the above two adjacent tooth-holding ends is at a low level, there will be interlinked magnetic lines of force 412 due to self coupling between adjacent tooth-holders, as shown in FIG. 1B. Because the interlinked magnetic lines of force 412 due to self coupling do not flow through permanent magnets 311 of the rotor (i.e., the interlinked magnetic lines of force 412 due to self coupling will not generate torsion effect of armature reaction), the armature reaction of the motor will inevitably be weakened. Therefore, the output torsion of the motor will be reduced, and also the operational efficiency of the motor.

SUMMARY OF THE INVENTION

Accordingly, the object of the present invention is to propose a stator structure with single-arm tooth holders, which can keep a lower cogging torque in the rotation direction of a motor at the same time of raising the magnetic reluctance between adjacent tooth holders of the stator.

FIG. 1A is an assembly diagram of a stator and a rotor of a conventional motor with symmetric tooth holders, wherein the spacing 217 between two adjacent tooth holders is designed to be smaller. This design will inevitably let a magneto motor have a lower cogging torque. Therefore, smooth operation can be accomplished for both the operations of forward and reverse rotations. However, the magnetic reluctance of magnetic lines of force 41 between two adjacent tooth holders will be smaller. If a larger exciting current is inputted into the magneto motor, the magnetic lines of force 41 generated by exciting coils of the stator will be stronger. Part of the above magnetic lines of force 412 will thus be interlinked due to self coupling between adjacent stator tooth holders. Because the interlinked magnetic lines of force 412 due to self coupling cannot generate reaction force of armature reaction between the rotor and the stator, the operational efficiency of output torsion of the motor will thus be reduced.

The present invention can let a magneto motor operating under a unidirectional operation of heavy load keep a high operational efficiency and stable rotation. If the operational efficiency under a unidirectional operation of heavy load is to be kept at the same time of having a lower cogging torque (stable rotation), it is necessary to reserve the tooth holder in the same rotation direction of each tooth-holding end of the stator and cut the other tooth holder in the reverse direction. Because the stator's tooth holders in the rotation direction of heavy load are not cut, wider outer edge faces 220 corresponding to rotary surfaces 313 of the rotor are reserved. In other words, the original lower cogging torque is kept in the rotation direction of heavy load. Therefore, the motor will have a stable and smooth operation. The tooth holders at the reverse side are cut to enlarge the spacing 218 between adjacent tooth holders, hence enlarging the magnetic reluctance between adjacent tooth holders. The magnetic reluctance of air gap of the outer edge faces 220 corresponding to the rotary surfaces 313 of the rotor will be much lower than the magnetic reluctance between adjacent single-arm tooth holders 218. The magnetic lines of force 41 generated by exciting coils of the stator will naturally flow to the rotor so that the stator and the rotor can generate magnetic lines of force flowing between them to accomplish complete armature reaction of the motor, as shown in FIG. 2C. Therefore, the operational efficiency and the stability of rotation of the magneto motor operating under a heavy load will be enhanced.

The various objects and advantages of the present invention will be more readily understood from the following detailed description when read in conjunction with the appended drawing, in which:

DETAILED DESCRIPTION OF THE PREFERRED EMBODIMENTS

Figure 1A:
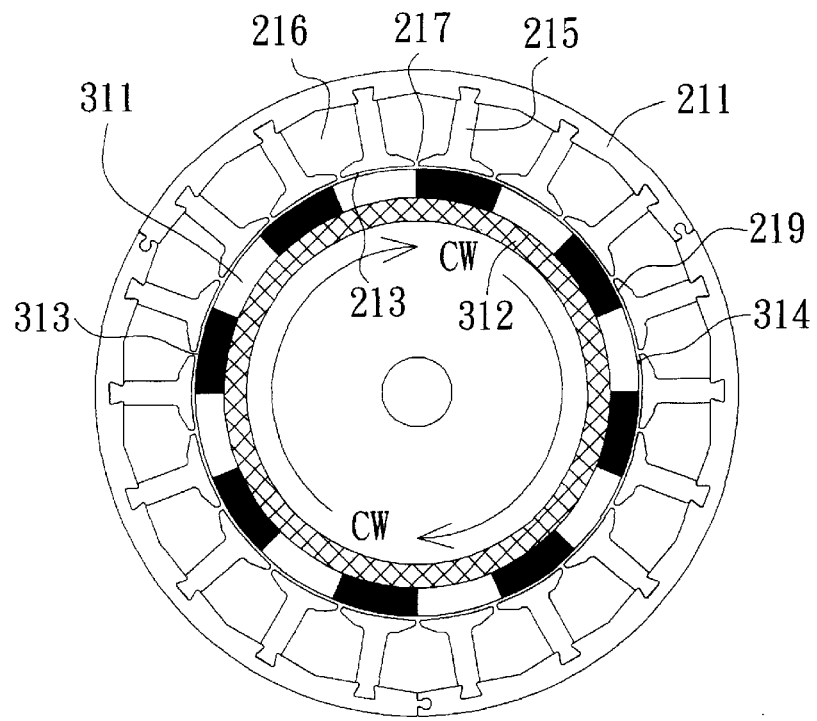
FIG. 1A is a structure diagram of stator's tooth holders of a magneto motor in the prior art.
Figure 1B:
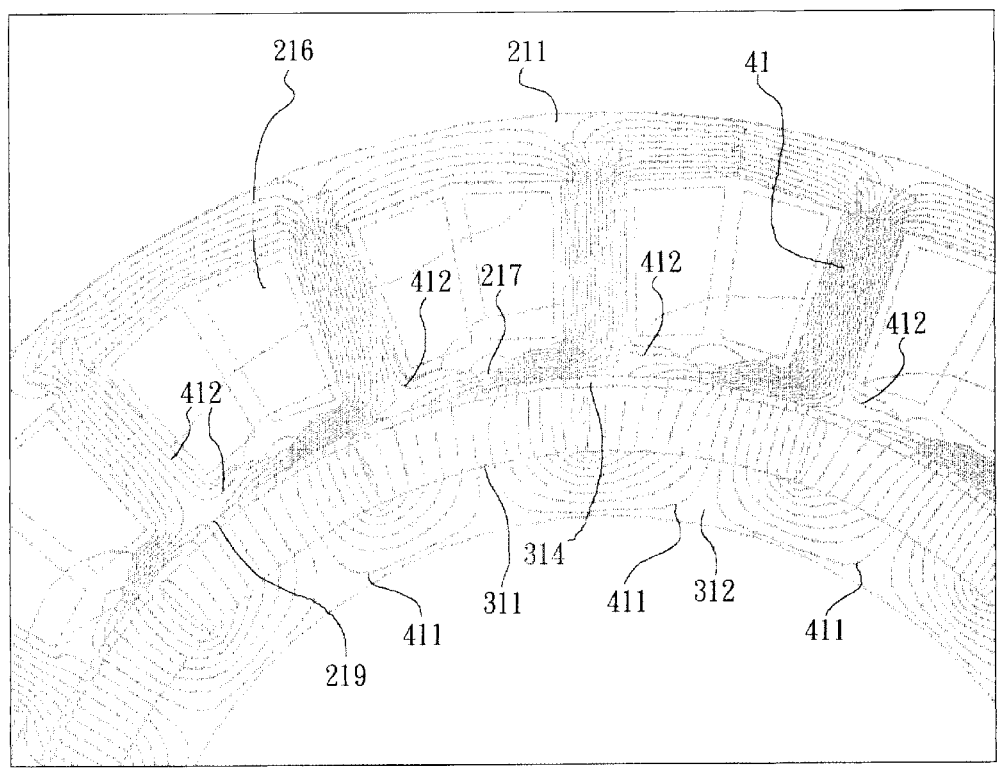
FIG. 1B is a diagram for the analysis of the magnetic circuit of armature reaction of the stator's tooth holders shown in FIG. 1A.
Figure 2A:
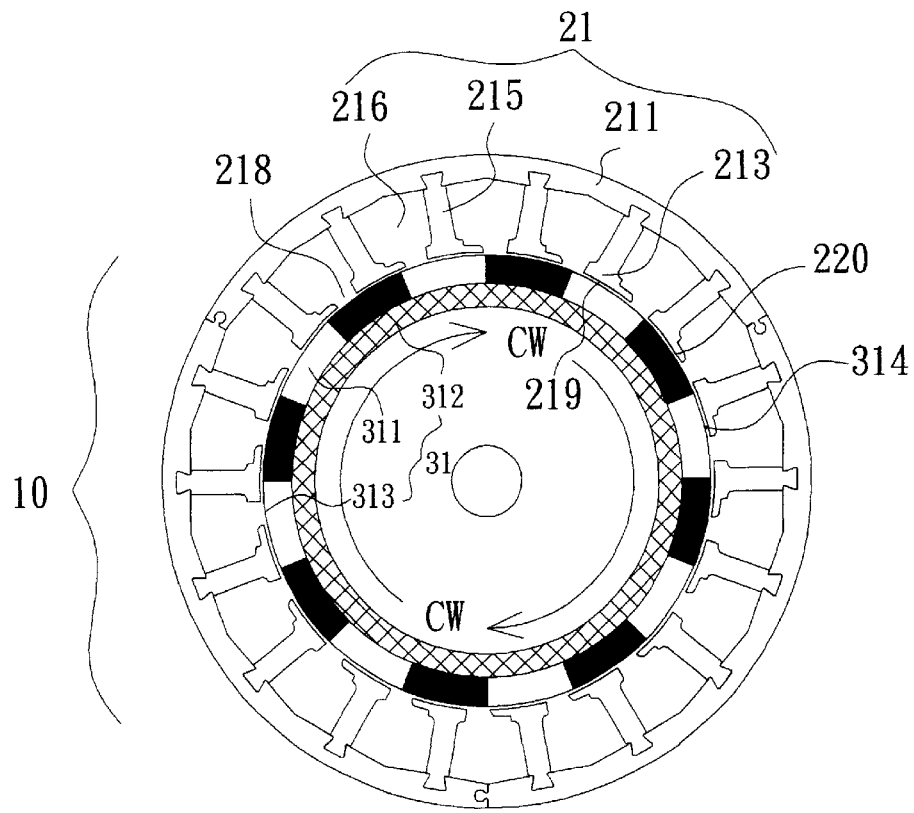
FIG. 2A is a structure diagram of separable single-arm tooth holders of an outer stator according to a first embodiment of the present invention.
Figure 2B:
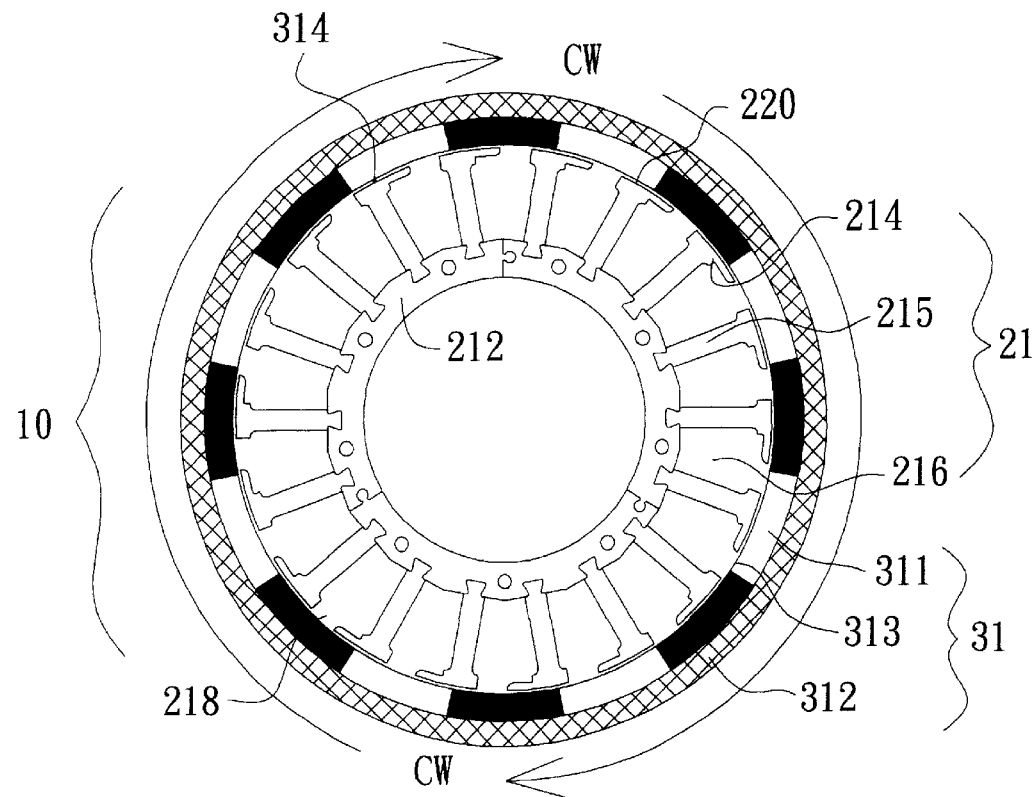
FIG. 2B is a structure diagram of separable single-arm tooth holders of an inner stator according to a second embodiment of the present invention.
Figure 2C:
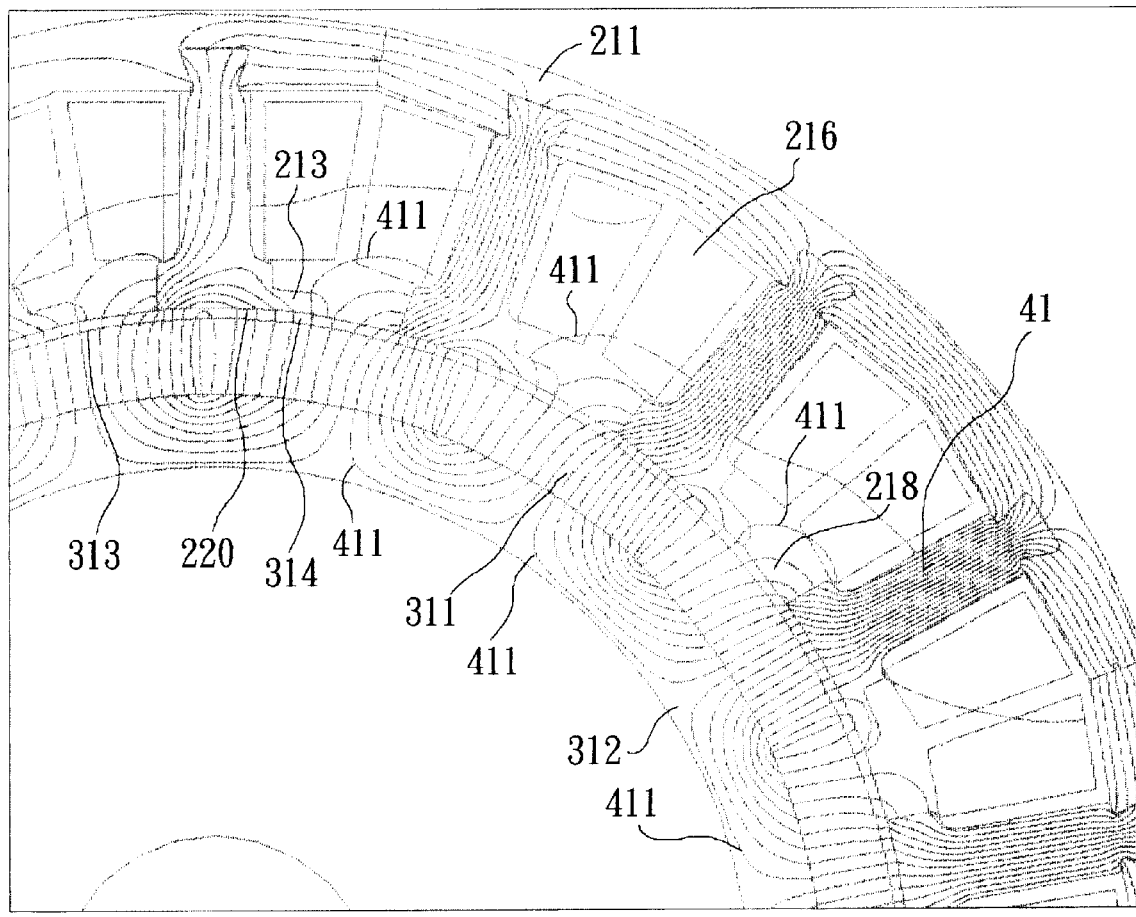
FIG. 2C is a diagram for the analysis of the magnetic circuit of armature reaction of the single-arm tooth holders shown in FIG. 2A.
Figure 3A:
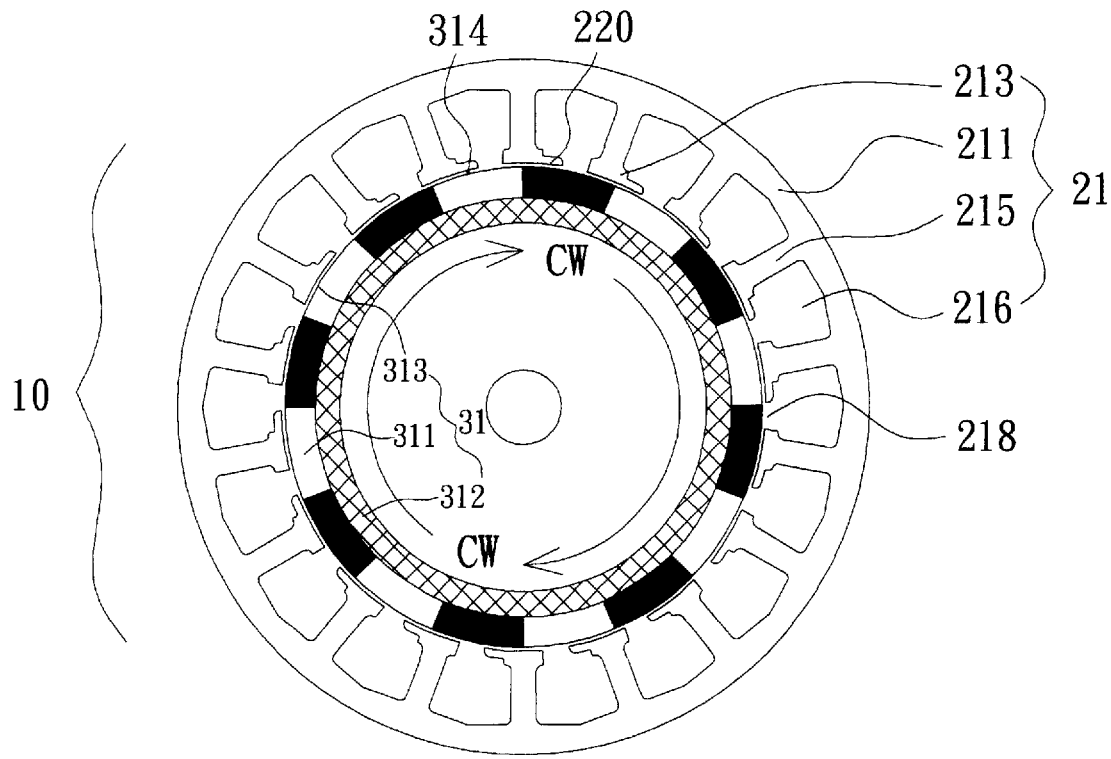
FIG. 3A is a structure diagram of integral single-arm tooth holders of an outer stator according to a third embodiment of the present invention.
Figure 3B:
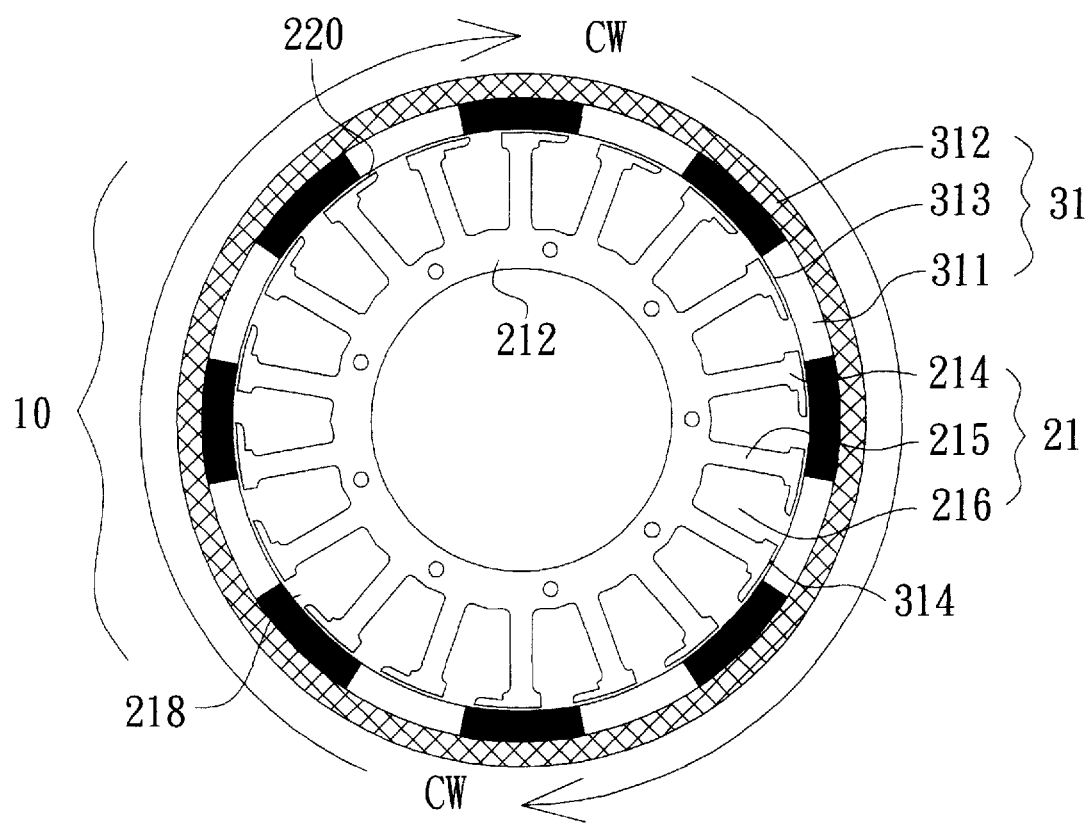
FIG. 3B is a structure diagram of integral single-arm tooth holders of an inner stator according to a fourth embodiment of the present invention.

As shown in FIGS. 1A to 3B, a stator structure 10 with single-arm tooth holders of the present invention comprises a magneto motor stator 21 having a plurality of single-arm tooth holders 213 and 214. The single-arm tooth holders 213 and 214 are concentrically and adjacently arranged in a circular shape. A root end 215 is extended rearwards from each of the single-arm tooth holders 213 and 214. A wire slot 216 is formed between every two adjacent root ends 215 to receive an exciting winding coil therein. The tooth-holding end of each of the tooth holders 213 and 214 in the rotation direction of heavy load is reserved, while the tooth-holding end thereof in the reverse direction is cut, hence forming a single-arm tooth holder 213 and 214 with two asymmetric sides.

The stator of the magneto motor can be an outer stator, and the single-arm tooth holders of the stator can be separated from an outer stator ring of the motor.

The stator of the magneto motor can be an inner stator, and the single-arm tooth holders of the stator can be separated from an inner stator ring of the motor.

The stator of the magneto motor can be an outer stator, and the single-arm tooth holders of the stator can be integrally formed with an outer stator ring of the motor.

The stator of the magneto motor can be an inner stator, and the single-arm tooth holders of the stator can be integrally formed with an inner stator ring of the motor.

The shape of the single-arm tooth holder 213 or 214 can be properly altered according to the characteristics of rotation direction and cogging torque of the magneto motor.

Because a higher magnetic reluctance is generated between two adjacent single-arm tooth holders 213 and 214, the self coupling phenomenon of magnetic lines of force between adjacent tooth holders of the stator can be reduced when the magneto motor operates under a high load. Armature reaction of the magneto motor operating under a high load can thus be intensified to enhance the operational efficiency, stability, and smoothness.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A stator structure for a unidirectional magneto motor comprising a plurality of stator teeth disposed in angularly spaced relationship to form an annular configuration with wire slots being formed between each adjacent pair of stator teeth to receive an excitation coil therein, each of said stator teeth having an L-shaped contour defined by an asymmetric end portion and an elongated root portion extending from said asymmetric end portion, said asymmetric end portion having opposing sides thereof extending in a substantially transverse direction with respect to said root portion, a first of said opposing sides extending in a direction of rotation of a rotor of said magneto motor and extending a greater distance from said root portion than a second of said opposing sides to thereby reduce magnetic self coupling between adjacent stator teeth.

* * * * *